(12) United States Patent
Haney et al.

(10) Patent No.: US 6,571,454 B1
(45) Date of Patent: Jun. 3, 2003

(54) DRIVE TEST FIXTURE

(76) Inventors: Michael D. Haney, 3001 Pheasant Run Rd., Apt. 282, Norman, OK (US) 73072; Rodney L. Cooper, Rte. 2, Box 299A-1, Wewoka, OK (US) 74884; Don C. Yarbrough, 3248 SW. 99, Oklahoma City, OK (US) 73159; Michael G. Roper, Rte. 2, Box 113, Hinton, OK (US) 73049; Thanh V. Huynh, 10200 Bradford Way, Yukon, OK (US) 73099; Steven F. Knecht, Rte. 4, Box 95C, Okarche, OK (US) 73762; Tony T. Thongham, 116 NW. 26th, Oklahoma City, OK (US) 73103

( * ) Notice: Subject to any disclaimer, the term of this patent is extended or adjusted under 35 U.S.C. 154(b) by 0 days.

(21) Appl. No.: 09/526,269

(22) Filed: Mar. 15, 2000

Related U.S. Application Data

(60) Provisional application No. 60/145,508, filed on Jul. 23, 1999.

(51) Int. Cl.[7] .......................... G11B 5/127; H04R 31/00
(52) U.S. Cl. .................. 29/603.03; 29/593; 29/729; 29/737; 29/760; 310/89; 310/91; 324/210; 324/212; 324/262; 360/99.08; 360/98.07; 360/99.04
(58) Field of Search .............................. 29/593, 603.03, 29/729, 737, 760; 324/210, 212, 262; 310/89, 91; 360/99.08, 98.07, 99.04

(56) References Cited

U.S. PATENT DOCUMENTS

| | | | |
|---|---|---|---|
| 3,753,281 A | 8/1973 | Arlt et al. ..................... 29/205 |
| 4,078,302 A | 3/1978 | Fok et al. ..................... 29/741 |
| 4,399,988 A | 8/1983 | De Shong ..................... 269/8 |
| 4,475,281 A | 10/1984 | Holecek ..................... 29/603 |
| 4,505,034 A | 3/1985 | Reidt ..................... 29/749 |
| 4,625,393 A | 12/1986 | Fuchs ..................... 29/603 |
| 4,862,584 A | * 9/1989 | Budy et al. ..................... 29/704 |
| 4,901,430 A | 2/1990 | Noguchi et al. ..................... 29/603 |
| 4,969,252 A | 11/1990 | DiGregorio ..................... 29/603 |
| 5,197,181 A | 3/1993 | Abe et al. ..................... 29/596 |
| 5,265,325 A | 11/1993 | Fortin ..................... 29/742 |
| 5,454,157 A | 10/1995 | Ananth et al. ..................... 29/603 |
| 5,745,983 A | * 5/1998 | Quintana et al. ..................... 29/759 |
| 5,783,370 A | 7/1998 | Groom et al. ..................... 430/318 |
| 5,795,177 A | * 8/1998 | Hirono ..................... 439/378 |
| 5,978,347 A | * 11/1999 | Akama et al. ..................... 369/219 |
| 6,105,240 A | * 8/2000 | Chuang et al. ..................... 29/729 |

* cited by examiner

*Primary Examiner*—Peter Vo
*Assistant Examiner*—Paul Kim
(74) *Attorney, Agent, or Firm*—Mitchell K. McCarthy

(57) ABSTRACT

An apparatus and associated method for attaching a disc drive cover member to a disc drive base member. A fixture comprises a base and a stop guard, cradle and guide rails supported by the base. The disc drive base member is operatively receivingly engaged in the cradle adjacent the guide rails. The disc drive cover member is operatively abuttingly engaged at one end against the stop guard and pivoted toward the disc drive base member. Any substantial misalignment of the disc drive cover member with the disc drive base member causes the disc drive cover member to engage at least one of the guide rails and therefore be urged into proper alignment, preventing adverse contact between the disc drive cover member and the disc drive base member.

11 Claims, 9 Drawing Sheets

DRIVE TEST FIXTURE

RELATED APPLICATION

This application claims the benefit of U.S. Provisional Application Serial No. 60/145,508, filed Jul. 23, 1999 under 35 U.S.C. 119(e).

FIELD OF THE INVENTION

The present invention relates to the field of mass storage devices. More particularly, this invention relates to a drive test fixture for testing or assembling a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

Many of these parts are easily damaged particularly when the disc drives are being assembled or tested. Existing assembly and testing methods include hand assembly of drives. Drive covers may be attached and aligned to the drive bases by using hand-eye coordination. The drive covers may include PCBA (Printed Circuit Board Assembly) connectors. In order to meet productivity goals, assemblers may inadvertently slip or misjudge the location of the parts to be assembled, causing inadvertent contact of sensitive parts resulting in damage and excessive defects. In order to prevent such damage, assemblers may be very deliberate and slow, decreasing productivity. In addition, if the tolerances are close, such as with aligning the male and female ends of a PCBA connection, aligning the parts may be difficult to accomplish by hand.

What is needed is a disc drive test fixture that eases alignment, improves productivity, and reduces damage and cost.

SUMMARY OF THE INVENTION

The present invention is a drive test fixture and method which provides ease of alignment, improved productivity with reduced damage and cost. In accordance with one embodiment of the invention, a drive fixture is provided including a base, a stop guard, a pair of guide rails, and a cradle. The stop guard and the guide rails may be located on the base for positioning a cover against the stop guard and between the guide rails. The stop guard, the guide rails, and the cradle may be located so that one end of the cover may be pivoted at the stop guard as the other end is lowered between the cradle and the guide rails. The guide rails may have a width and a height so that a misaligned cover contacts the top edge of at least one of the guard rails before contacting the base of the disc drive. The guide rails may have chamfered edges. The pair of guide rails may be parallel to each other and have an adjustable width of separation. The base may have slotted openings for adjusting the guide rails by fastening the guide rails through the slotted openings. The stop guard may have a slot or may be C-shaped for positioning the cover. The drive fixture may also include dowel pins for removably attaching the cradle to the base, with the base having dowel bores for receiving the dowel pins and the cradle having dowel slots for receiving the dowel pins. The cradle may have a recess opening for receiving the base of the disc drive.

Also disclosed is a method for assembling a cover of a disc drive to a base of a disc drive. The method includes the steps of providing a drive fixture having a stop guard and a pair of guide rails, positioning the cover against the stop guard, lowering the cover between the pair of guide rails and over the base of the disc drive, and fastening the cover of the disc drive to the base of the disc drive. Positioning the cover against the stop guard may also include pivoting one end of the cover at the stop guard and lowering the other end of the cover between the guard rails and the base of the disc drive with the guard rails protecting the base of the disc drive from damage by the cover. The cover and base of the disc drive may also include a PCBA connector with a male and female end. The PCBA connector ends may also be aligned, connected and protected. Providing a drive fixture may also include providing a pair of guard rails dimensioned so that a misaligned cover contacts the top of at least one of the guide rails before contacting the base of the disc drive. Providing a drive fixture may also include providing a cradle. Lowering the cover between the guide rails and over the base of the disc drive may include lowering the cover between the pair of guide rails and the cradle. The method may also include moving the cover away from the stop guard and parallel to the pair of guide rails for positioning the cover for attachment to the base of the disc drive, prior to fastening the cover of the disc drive to the base of the disc drive. The method may also include moving the cover away from the stop guard and parallel to the pair of guide rails for positioning the male and female ends of a connector, prior to fastening the cover of the disc drive to the base of the disc drive. The method may also include fastening additional parts to the disc drive.

The invention also discloses a drive fixture including a holding means for holding a base for a disc drive, and a positioning means for positioning a cover for the disc drive for attachment to the base for the disc drive.

Advantageously, the present invention provides ease of alignment, and improved productivity with reduced damage and cost. The drive fixture provides a device and method for easily aligning drive covers for attachment to drive bases. The present invention aligns the parts without the need of good hand-eye coordination. The stop guard and guide rails align the cover onto the base with minimal effort. In addition, the present invention allows the assembly of disk drives without the worry of damaging the disc drives or connectors by inadvertently slipping or misjudging the location of parts, increasing productivity and reducing damage.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The invention described in this application is useful for assembling and testing all mechanical configurations of disc drives having either rotary or linear actuation. In addition, the invention is also useful for all types of disc drives including hard disc drives, zip drives, floppy disc drives and any other type of drives where assembly and testing may be desirable.

Figure 1:
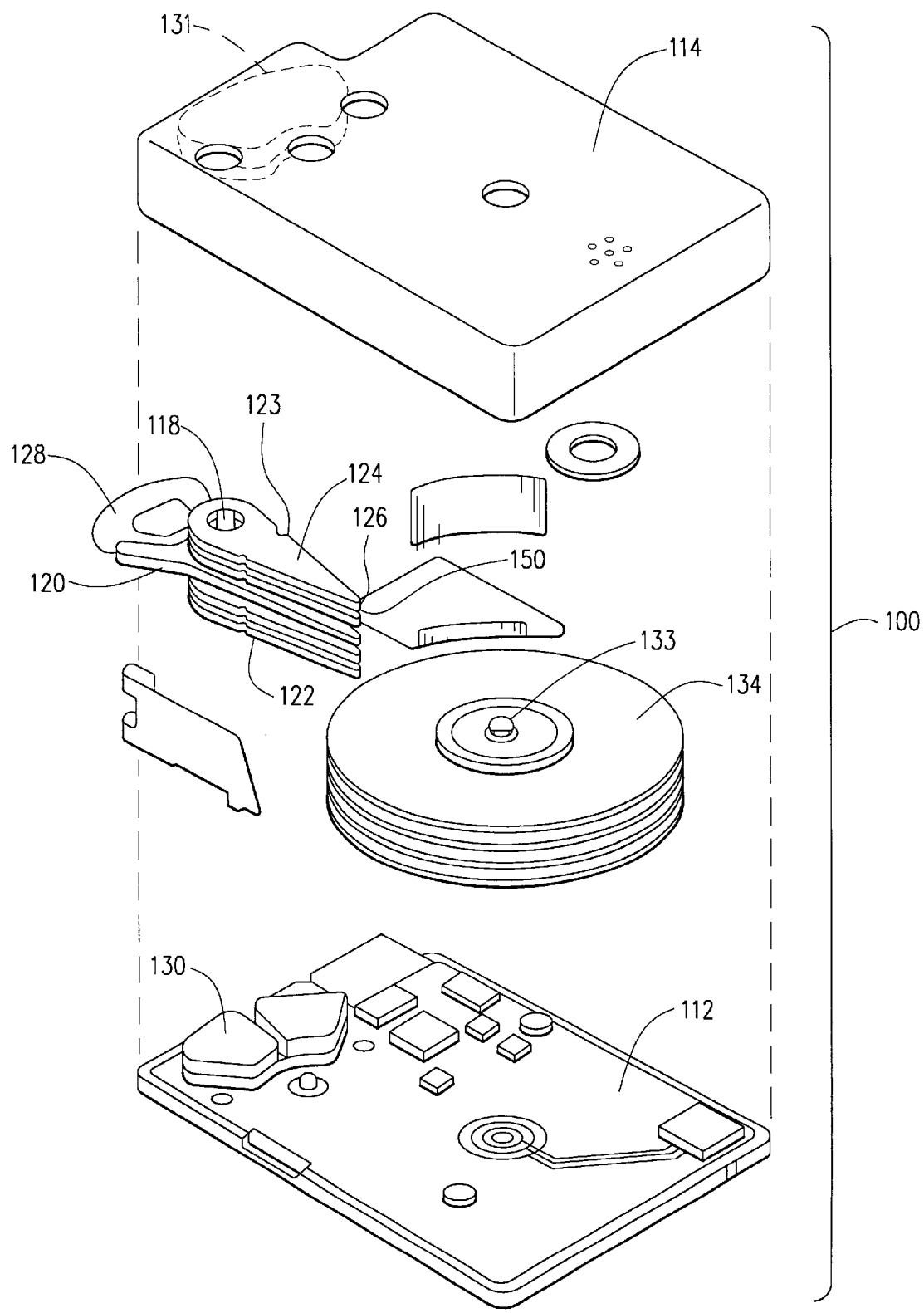
FIG. 1 is an exploded view of a disc drive with a multiple disc stack and a ramp assembly for loading and unloading transducers to and from the surfaces of the discs.

FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
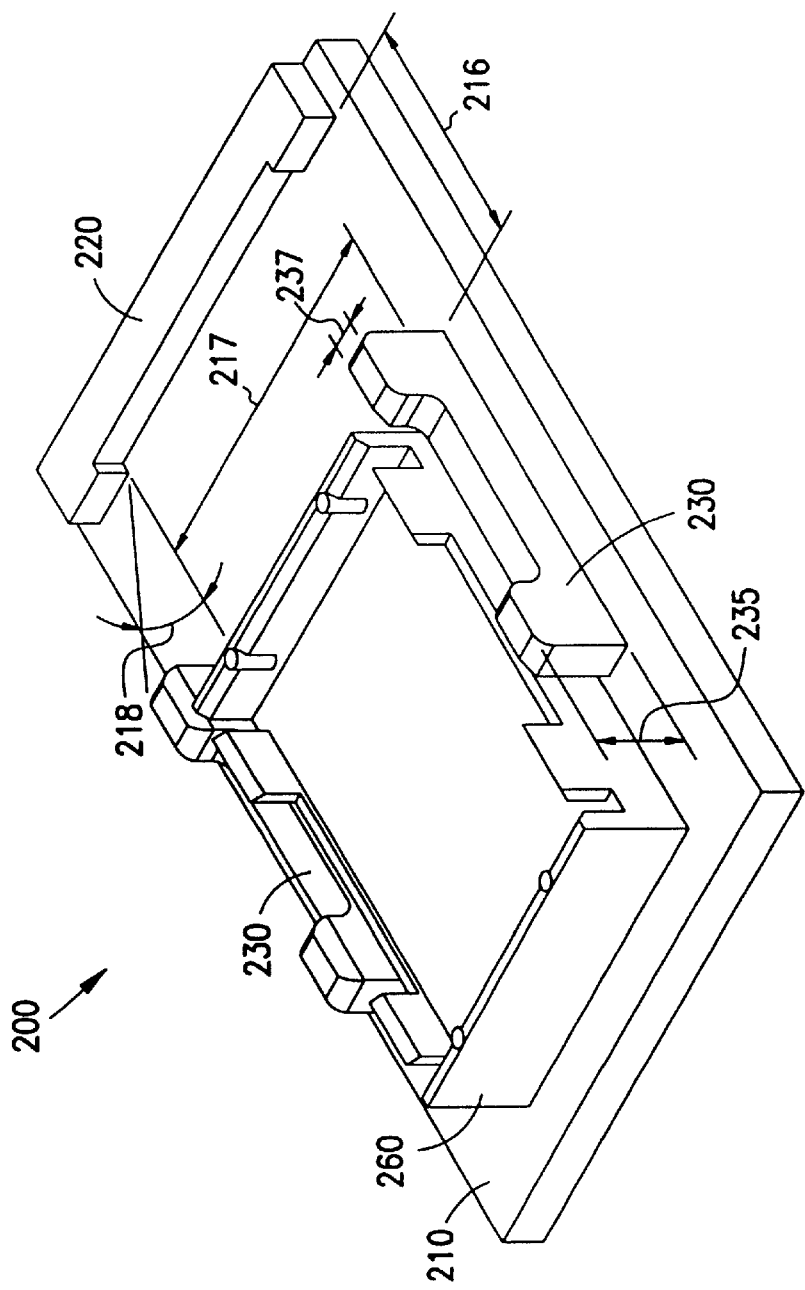
FIG. 2 is a perspective view of one embodiment a drive fixture.
Figure 3:
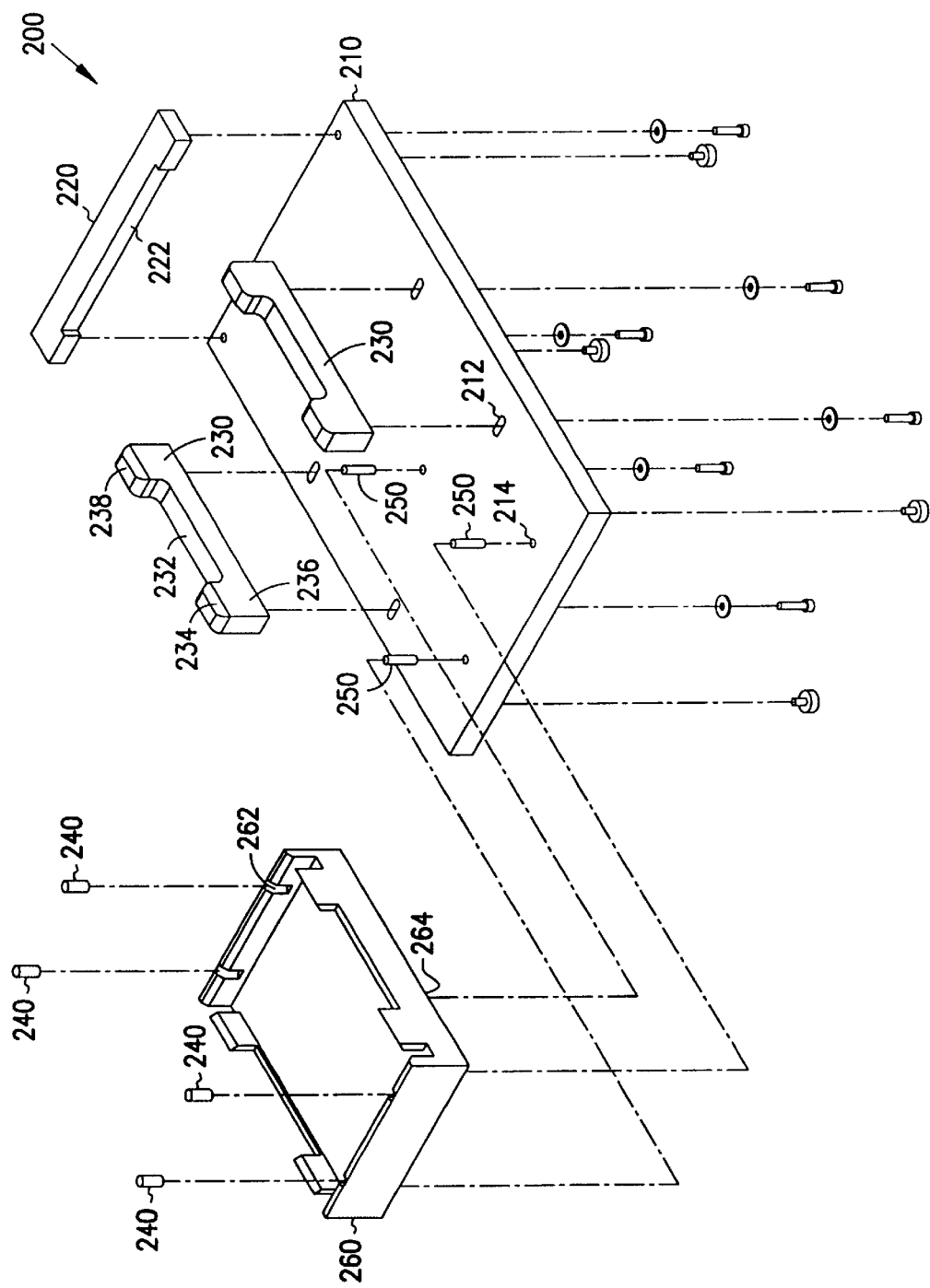
FIG. 3 is an exploded view of one embodiment of a drive fixture.

FIG. 2 is a perspective view of one embodiment of a drive test fixture 200 and FIG. 3 is an exploded view of the same drive test fixture 200. The drive test fixture 200 is used to assemble or test disc drives with ease of alignment, less damage, lower cost, and easy operation and insertion.

The drive fixture 200 includes a base 210, a stop guard 220, a pair of guide rails 230, and a cradle 260. The drive fixture 200 may also include a plurality of bumpers 240, and a plurality of dowel pins 250.

The base 210 supports the guard rails 230, the stop guard 220 and the cradle 260 and is preferably made of ESD (Electro Static Discharge) safe plastic such as Ensential.

The stop guard 220 and guide rails 230 are positioned on the base 210 so that the disc drive 100 may be assembled, disassembled, or tested without damaging the disc drive 100. The stop guard 220 is generally positioned on one end of the base 210 perpendicular to the pair of guide rails 230 which are generally parallel to each other. The stop guard 220 and the guide rails 230 are positioned on the base 210 so that the cover 114 to the disc drive 100 may be attached without damaging the base 112 of the disc drive 100 or any connectors 410 on the cover or base such as an PCBA connector. In general, one end of the cover 114 is positioned in the slot 222 of the stop guard 220 and pivoted against the stop guard 220 as the other end of the cover 114 is lowered between the guide rails 230 and over the cradle 260 and the base 112 of the disc drive 100. The slot 222 generally provides lateral positioning of the cover 114 and provides support for pivoting the cover 114 against the stop guard 220.

The cover 114 and base 112 may include a connector 410 such as a PCBA connector. The connector 410 may have a male end with pins and female end with openings. One of the male or female ends may be located on the cover 114 with the other end located on the base 112. The male and female ends may need to be mated as part of the assembly of the disc drive. The alignment of the cover may include alignment of the male and female ends of the connector 410. Proper alignment of the connector may reduce damage to the connector during assembly, particularly reducing damage to the pins.

The guide rails 230 are located on the base 210 generally on both sides of the cradle 260 to keep the cover from damaging the base 112 of disc drive 100. The guide rails 230 are equidistant from the stop guard 220 and located with a gap 216 between the stop guard 220 and the guide rails 230. The guide rails 220 are located so that when the cover 114 is pivoted towards the cradle 260 that the cover 114 creates a contact angle 218 between the base 210 and the cover 114 at the point of contact of the cover 114 and the guide rail 230. The contact angle 218 is great enough so that the cover 114 does not contact the cradle 260 and the base 112 of the disc drive 100 even if the guide rails 230 are shorter than the cradle 260 and the base 112 of the disc drive 100. However, the contact angle 218 should also be minimized so that the cover 114 meets the guide rails 230 as close to horizontal with the base 210 as possible to allow for easier pivoting and alignment of the cover 114.

The cradle 260 is generally located between the pair of guide rails 230. The distance between the cradle 260 and the stop guard 220 is preferably more than the gap 216 between the stop guard 220 and the guide rails 230. However, the distance between the cradle 260 and the stop guard 220 may be equal to or less than the gap 216 so long as the contact angle 218 is great enough so that the cover 114 does not contact the cradle 260 or the base 112 of the disc drive 100. In addition, the distance between the cradle and the stop guard should be great enough to allow clearance for assembly and alignment of a connector 410, if the cover and base have a connector 410. The cradle 260 is preferably located equidistant between the guide rails 230. However, if the cover 114 had different thicknesses on each side, the distances could be adjusted to accommodate the differences in thickness. The distance between the guide rails 230 and the cradle 260 is preferably just enough to allow the cover 114 to fit between the each guide rail and the base 112 of the disc drive 100.

The base 210 has various openings for attaching the stop guard 220 and guide rails 230 with fasteners to the base 210. The guide rails 230, having an adjustable width of separation 217, may be adjusted to move the guide rails 230 closer together or further apart. The guide rails 230 may be attached to the base 210 with fasteners through slotted openings 212 to provide for adjustment of the position of each of the guide rails relative to the cradle 260 and relative to the slot 222 of the stop guard 220 and to provide for adjustment of the width of separation 217.

The base 210 also includes dowel bores 214 for receiving dowel pins 250 for attachment to the cradle 260. The dowel bores 214 are positioned in the base 210 to removably attach and position the cradle 260 relative to the guide rails 230 and the stop guard 220. The dowel bores 214 are sized to receive the dowel pins 250. The dowel bores 214 preferably do not penetrate all the way through the base 210. The base 210 also may include four bumper feet for supporting the base 210.

The stop guard 220 is preferably made of ESD safe plastic and of a generally rectangular shape. The stop guard 220 preferably has a slot 222 for receiving one end of the cover 114 of the disc drive 100. The slot 222 provides lateral and pivoting support to the cover 114 as it is placed over the disc drive 100 between the guide rails 230. The slot 222 provides additional positioning support to generally align the cover 114 over the base 112 of the disc drive 100. The slot 222 is sized to receive one end of the cover 114 of the disc drive 100.

The guide rails 230 are preferably made of ESD safe plastic and of generally rectangular shape. The guide rails are attached to base 210 with fasteners through slotted openings in the base 210. The guide rails 230 have a channel 232 cut across the top of the guide rail 230 creating a truncated C-shaped guide rail 230. The opening of the C-shaped channel 232 is directed upward to provide additional access from the side to the disc drive 100 during assembly. The guide rails 230 each have an inside surface 236 and a top 238, with the guide rails positioned so that the inside surfaces 236 face each other. The guide rails 230 have chamfered edges 234 on the coner of the inside surface 236 and the top 238 of each of the guide rails 230. The chamfered edges 234 help guide the cover 114 into place along the outside of the disc drive 100 as it is being assembled. The guide rails 230 have a height 235 and width 237. The guide rails 230 are dimensioned so that a misaligned cover 114 contacts the top 238 of at least one of the guide rails 230 before contacting the base 112 of the disc drive 100. The width 237 of the guide rails 230 should be greater than the distance between the cradle 260 and the guide rail 230 preventing the cover 114 from being lowered with one edge of the cover 114 inside the guide rails 230 and the other edge of the cover 114 outside the guide rails 230. The height 235 of the guide rails 230 should be great enough so that the cover 114 is prevented from contacting the cradle 260 and the base 112 of the disc drive 100. The height 235 of the guide rails 230 and the gap 216 between the stop guard and the guide rails 230 determine the contact angle 218 as previously described. Therefore, the height 235 of the guide rails 230 is preferably optimized along with the contact angle 218.

The bumpers 240 are preferably cylindrical rod shaped pieces of rubber designed to fit in the bumper slots 262 of the cradle 260. The bumpers 240 position the disc drive 100 on the cradle 260. The bumpers 240 are designed for insertion into each of the four cylindrical-shaped bumper slots 262 in the cradle 260. The bumpers 240 may provide alignment and protection of the disc drive 100.

The dowel pins 250 are preferably cylindrical rod shaped pieces of stainless steel designed to be received into the dowel slots 264 (not shown) of the cradle 260 and the dowel bores 214 of the base 210. The dowel pins 250 hold the cradle 260 in position with respect to the base 210.

The cradle 260 holds the disc drive 100 in position relative to the base 210. The cradle 260 may be designed to accommodate different sizes of disc drives 100 or different cradles 260 may be designed for different disc drives 100. The cradle 260 may be designed to position the base 112 of the disc drive 100 the proper distance above the base 210 for vertical alignment with the cover 114. The cradle may also provide vertical alignment for the male and female ends of a connector 410.

The drive fixture 200 provides a holding means for holding a base 112 for a disc drive 100 and a positioning means for positioning a cover 114 for the disc drive 100 for attachment to the base 112 for the disc drive 100.

Figure 4:
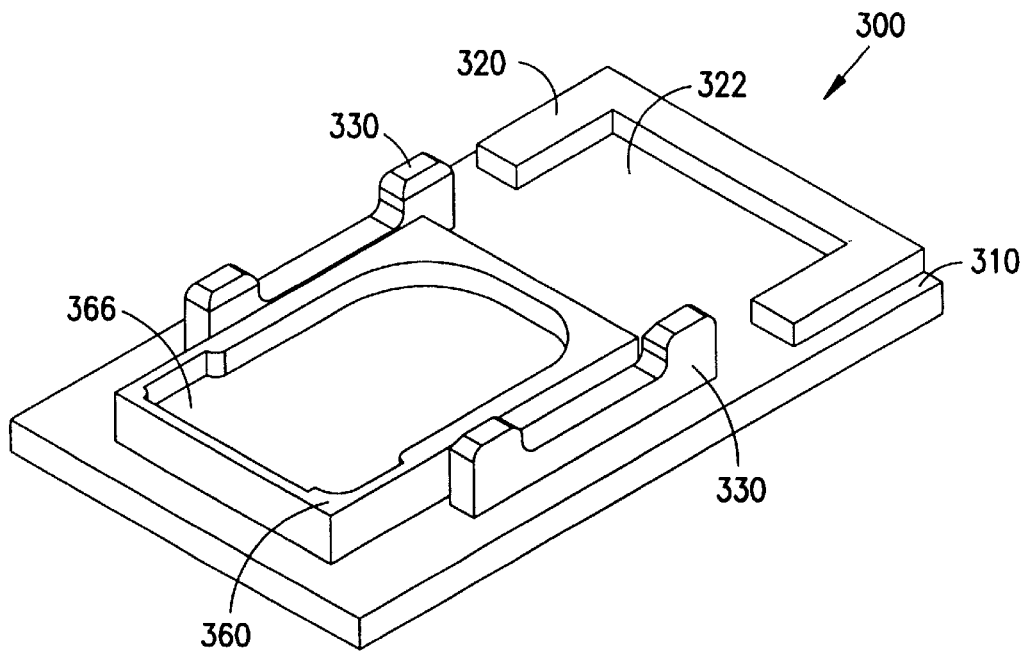
FIG. 4 is a perspective view of a second embodiment of a drive fixture.

FIG. 4 shows a second embodiment of a drive fixture 300. The second embodiment of the drive fixture 300 includes a base 310, a stop guard 320, a pair of guide rails 330, and a cradle 360. The guide rails 330 and the stop guard 320 are attached to the base 310.

Since the first and second embodiments are similar, only the differences between them will be described. The second embodiment 300 is similar to the first embodiment 200 except for two primary differences. First, the stop guard 320 of the second embodiment 300 has a deeper slot 322 for receiving the cover 114 of the disc drive 100. Second, the cradle 360 has a recess opening 366 for receiving the disc drive 100. The recess opening 366 is sized to receive the base 112 of the disc drive 100. The recess opening 366 may be cut out of foam and sized to fit the base 112 of the disc drive 100. Also, the guide rails 330, the stop guard 320, and the cradle 360 may be fixedly attached to the base 310 so that they are not adjustable or removable from the base 310. Otherwise, all other features of the first embodiment also apply to the second embodiment.

The drive fixture 300 provides a holding means for holding a base 112 for a disc drive 100 and a positioning means for positioning a cover 114 for the disc drive 100 for attachment to the base 112 for the disc drive 100.

The invention also includes a method of assembling a disc drive 100. The figures depict the second embodiment of the test drive fixture 300, however, either embodiment could be used for the method. The method is used to assemble disc drives with ease of alignment, less damage, lower cost, and easy operation and insertion.

FIGS. 4 through 12 show the method of assembling a disc drive 100.

FIG. 4 shows a test drive fixture 300 ready for use.

Figure 5:
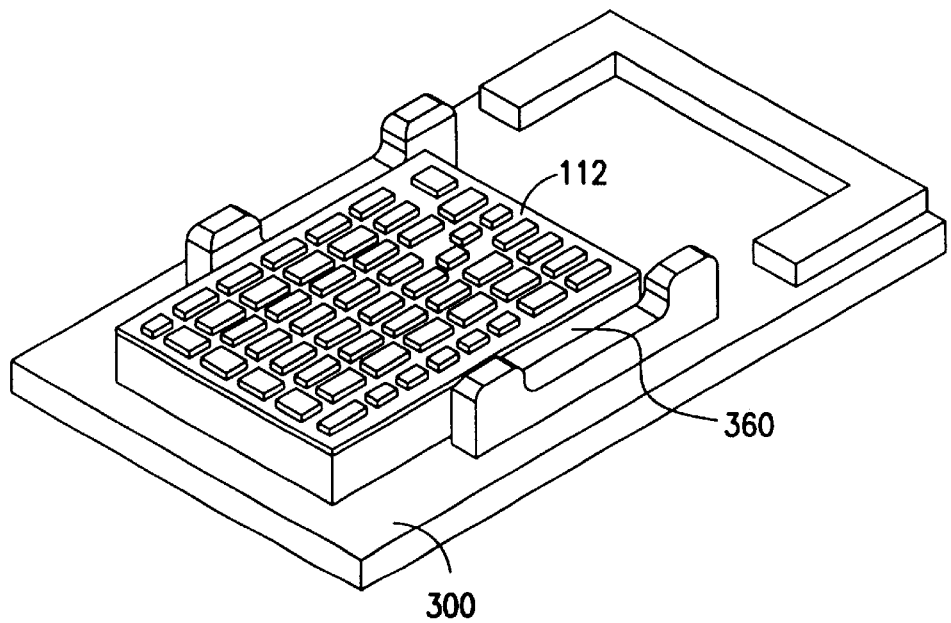
FIG. 5 is a perspective view of the second embodiment of the drive fixture with a disc drive base placed onto the cradle of the fixture.

FIG. 5 shows a disc drive base 112 placed onto the cradle 360.

Figure 6:
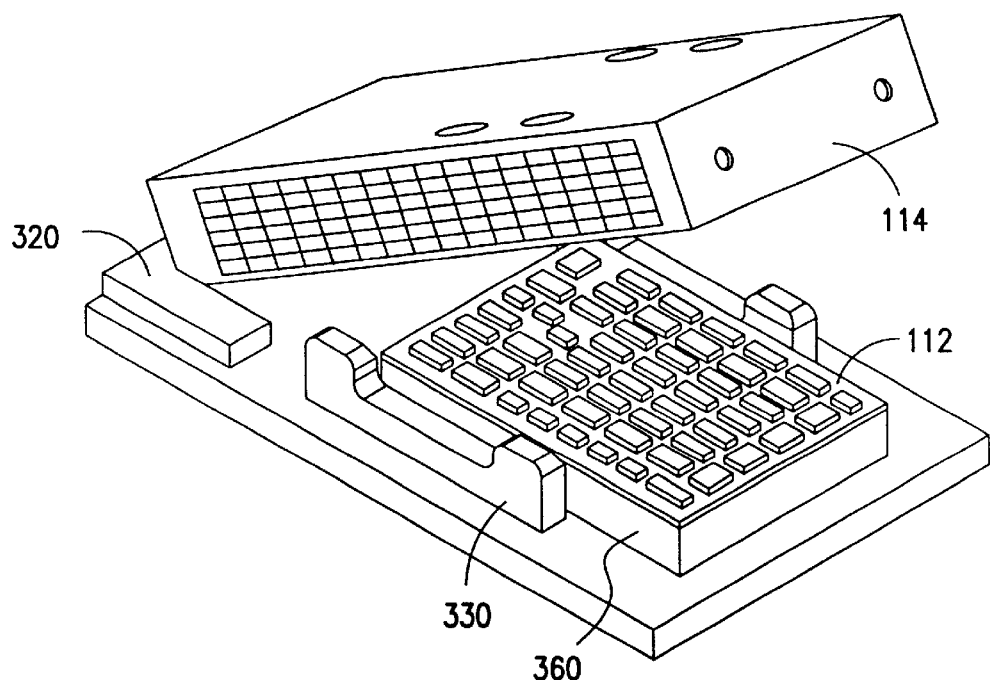
FIG. 6 is a perspective view of the second embodiment of the drive fixture showing using the drive fixture to position and lower the cover over the base of the disc drive.

FIG. 6 shows positioning of the cover 114 against the stop guard 320 and lowering and pivoting the cover 114 over the base 112 of the disc drive 100 and the cradle 360. The edges of the cover 114 are aligned into position by the guide rails 330 and the stop guard 320. The cover 114 is positioned by lowering and pivoting the cover 114 between the guide rails 330 and the cradle 360 which holds the base 112 of the disc drive 100.

Figure 7:
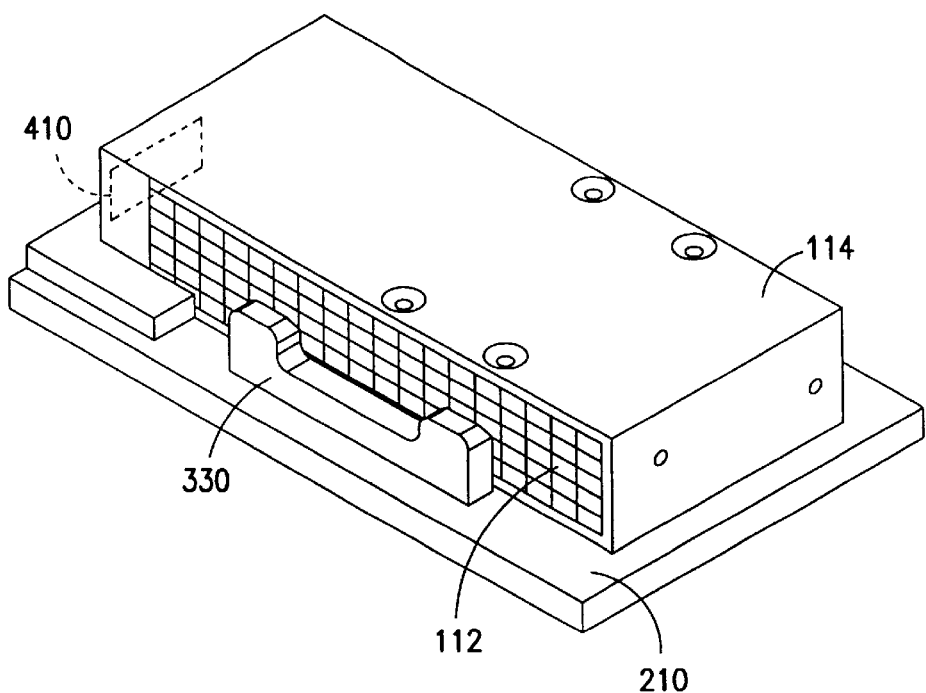
FIG. 7 is a perspective view of the second embodiment of the drive fixture showing adjusting the cover into position with respect to the base so that the cover may be fastened to the base.

FIG. 7 shows adjusting the cover 114 into position with respect to the base 112 so that the cover may be fastened to the base 112. The cover 114 is positioned over the base by sliding the cover 114 away from the stop guard 320 and parallel to the guide rails 330. The guide rails 330 keep the cover 114 in proper alignment and from damaging the disc drive 100. The guide rails 330 also keep the connector 410 in proper alignment and from damaging the pins of the connector.

Figure 8:
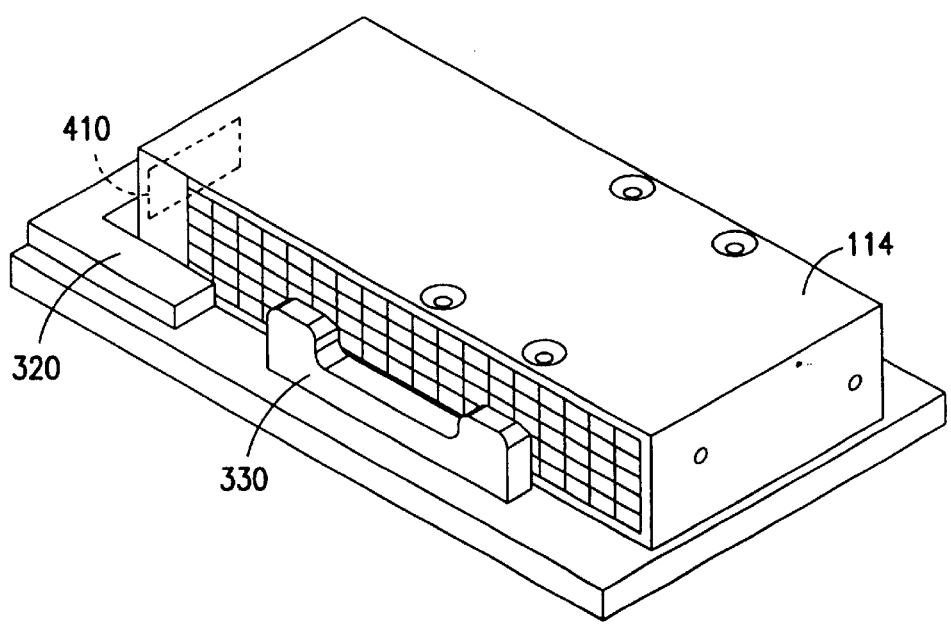
FIG. 8 is a perspective view of the second embodiment of the drive fixture showing the cover in place over the base of the disc drive ready for fastening.

FIG. 8 shows the cover 114 in place over the cradle 360 and base 112 of the disc drive 100 ready for fastening as the cover is positioned between the guide rails 330 and the cradle 360 (not shown). Note that the cover 114 is no longer positioned against the stop guard 320.

Figure 9:
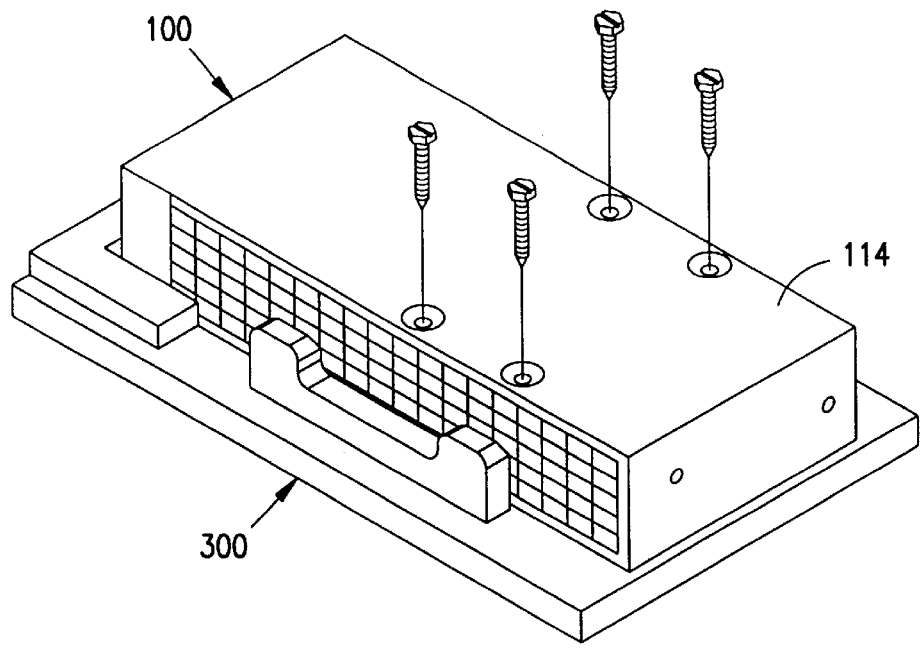
FIG. 9 is a perspective view of the second embodiment of the drive fixture showing fastening the cover to the base of the disc drive 100.

FIG. 9 shows fastening the cover 114 to the base 112 (not shown) of the disc drive 100. Once the cover is attached to the base 112 the disc drive 100 may be removed from the drive test fixture 300.

Figure 10:
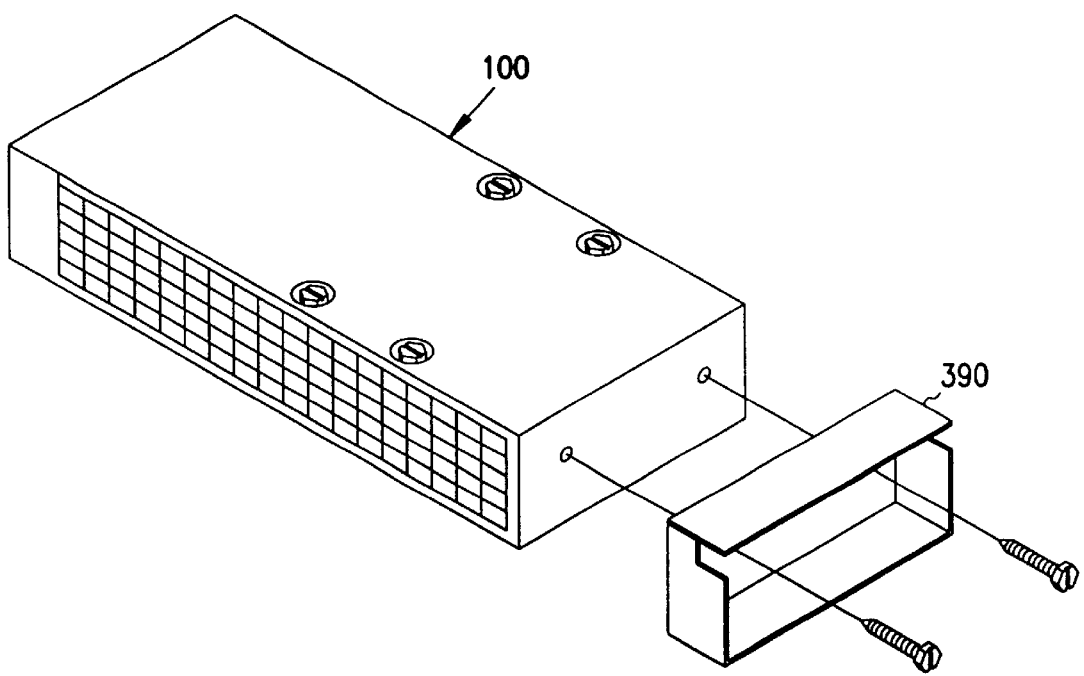
FIG. 10 is a perspective view of the disc drive showing fastening additional parts to the disc drive after removing the disc drive from the drive fixture.

FIG. 10 shows fastening additional parts 390 to the disc drive 100 after removing the disc drive 100 from the test drive fixture 300.

Figure 11:
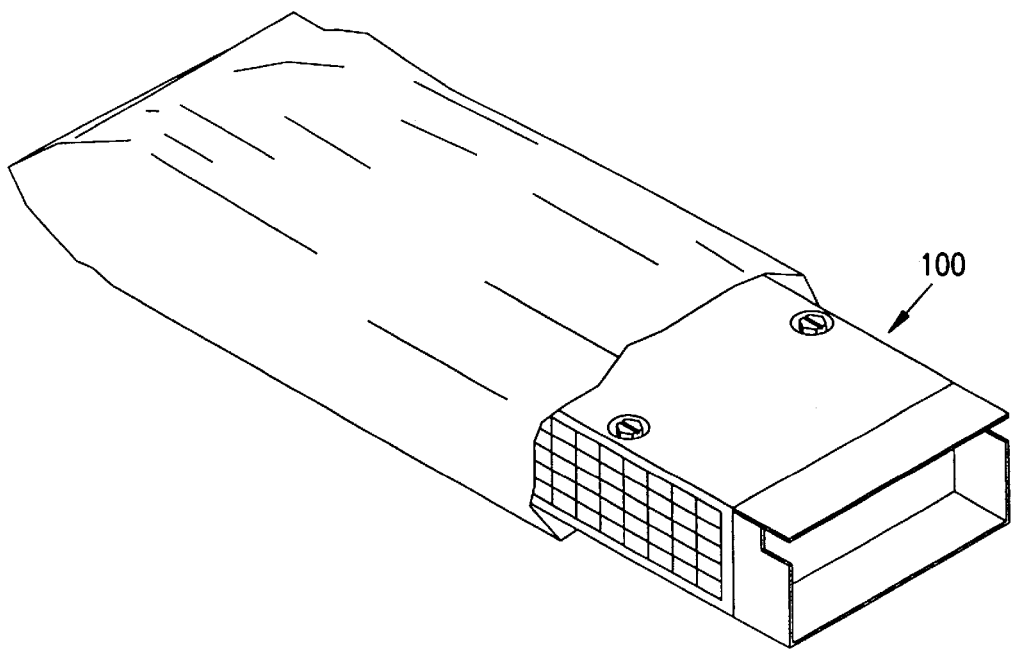
FIG. 11 is a perspective view of the disc drive showing placing the disc drive into packaging.

FIG. 11 shows placing the disc drive 100 into packaging for shipment.

Figure 12:
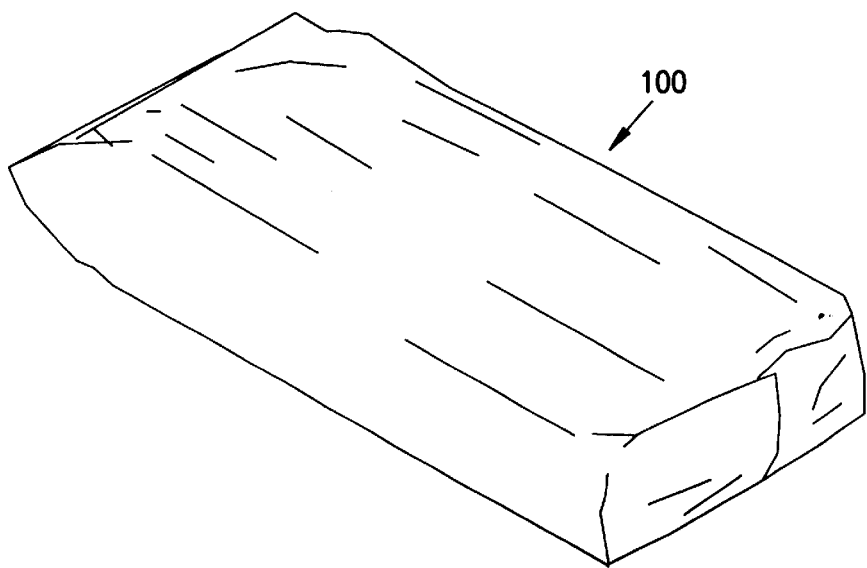
FIG. 12 is a perspective view of the packaged disc drive.

FIG. 12 shows the disc drive 100 packaged and ready for shipment.

Figure 13:
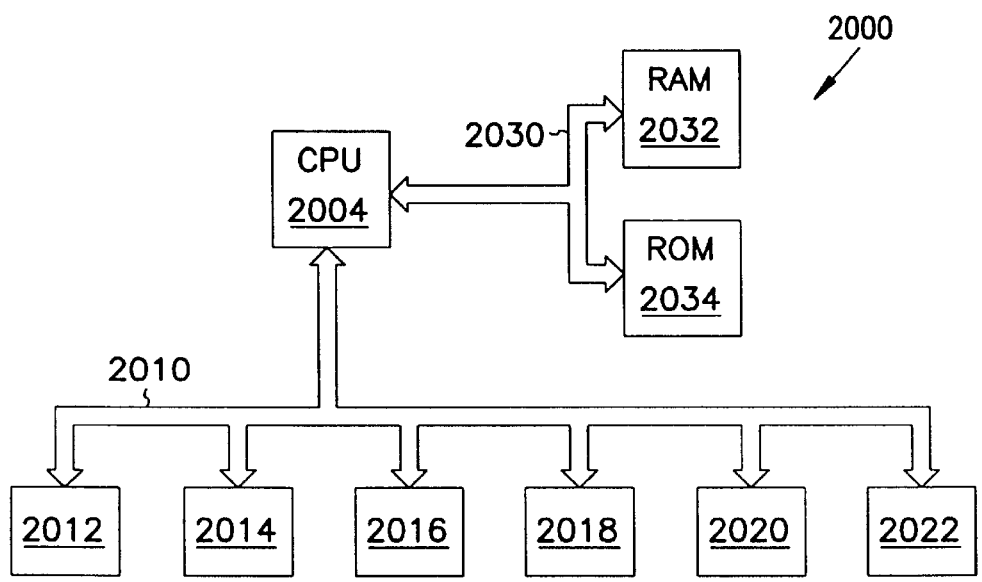
FIG. 13 is a schematic view of a computer system.

FIG. 13 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the test drive fixture and method described above.

In conclusion, a drive fixture 200 is disclosed. The drive fixture 200 includes a base 210, a stop guard 220 attached to the base 210, a pair of guide rails 230 attached to the base 210, and a cradle 260 attached to the base 210. The stop guard 220 and the guide rails 230 may be located on the base 210 for positioning a cover 114 against the stop guard 220 and between the guide rails 230. The cover 114 is for attachment to a base 112 of a disc drive 100. The stop guard 220, the guide rails 230, and the cradle 260 may be located for pivoting the cover 114 between the cradle 260 and the guide rails 230. The guide rails 230 may have a width 237 and a height 235 so that a misaligned cover 114 contacts the top 238 of at least one of the guard rails 230 before contacting the base 210 of the disc drive 100. The guide rails 230 may have chamfered edges 234. The pair of guide rails 230 may be parallel to each other and have a width of separation 217, the width of separation 217 being adjustable. The base 210 may have slotted openings 212 with the guide rails 230 fastened to the base 210 through the slotted openings 212. The slotted openings 212 may be for adjusting the width of separation 217. The stop guard 220 may have a slot 222 for positioning the cover 114. The stop guard 220 may be C-shaped for positioning the cover 114. The cradle 260 may be removably attached to the base 210. The drive fixture 200 may also include dowel pins 250, with the base 210 having dowel bores 214 for receiving the dowel pins 250 and the cradle 260 having dowel slots 264 for receiving the dowel pins 250. The dowel pins 250 may be for removably attaching the cradle 260 to the base 210. The cradle 260 may have a recess opening 366 for receiving the base 112 of the disc drive 100.

Also disclosed is a method for assembling a cover 114 of a disc drive 100 to a base 112 of a disc drive 100. The method includes the steps of providing a drive fixture 200 having a stop guard 220 and a pair of guide rails 230, positioning the cover 114 against the stop guard 220, lowering the cover 114 between the pair of guide rails 230 and over the base 112 of the disc drive 100, and fastening the cover 114 of the disc drive 100 to the base 112 of the disc drive 100. Positioning the cover 114 against the stop guard 220 may also include pivoting one end of the cover 114 at the stop guard 220 and lowering the other end of the cover 114 between the guard rails 230 and the base 112 of the disc drive 100 and the guard rails 230 protecting the base 114 of the disc drive 100 from damage by the cover 114. Providing a drive fixture 200 may also include providing a pair of guard rails 230 dimensioned so that a misaligned cover 114 contacts the top 238 of at least one of the guide rails 230 before contacting the base 112 of the disc drive 100. Providing a drive fixture 200 may also include providing a cradle 260. Lowering the cover 114 between the guide rails 230 and over the base 112 of the disc drive 100 may include lowering the cover 114 between the pair of guide rails 230 and the cradle 260. The method may also include moving the cover 114 away from the stop guard 220 and parallel to the pair of guide rails 230 for positioning the cover 114 for attachment to the base 112 of the disc drive 100, prior to fastening the cover 114 of the disc drive 100 to the base 112 of the disc drive 100. The method may also include fastening additional parts 390 to, the disc drive 100, after fastening the cover 114 of the disc drive 100 to the base 112 of the disc drive 100. The method may also include packaging the disc drive 100 for shipment, after fastening the cover 114 of the disc drive 100 to the base 112 of the disc drive 100.

The invention also discloses a drive fixture 200 including a holding means for holding a base 112 for a disc drive 100, and a positioning means for positioning a cover 114 for the disc drive 100 for attachment to the base 112 for the disc drive 100.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A drive fixture for aligning a disc drive cover member with a disc drive base member for joinder forming an enclosure for a data storage device, comprising:

a base;

a stop guard attached to said base;

a pair of guide rails attached to said base, at least one of the guide rails comprising a chamfered edge and the guide rails spatially separated defining a cavity therebetween the guide rails; and a cradle attached to said base and interposed adjacent the guide rails within the cavity, the cradle receivingly engageable with the disc drive base member, positioning the disc drive base member relative to the stop guard and the guide rails.

2. The drive fixture of claim 1 wherein said stop guard and said guide rails are located on said base for positioning the disc drive cover member against said stop guard and between said guide rails, the disc drive cover member adapted for attachment to the disc drive base member.

3. The drive fixture of claim 2 wherein said stop guard, said guide rails, and said cradle are located for pivoting the disc drive cover member between said cradle and said guide rails.

4. The drive fixture of claim 1 wherein said guide rails have a width and a height so that a misaligned disc drive cover member abuttingly engaging the stop guard at one end thereof and the other end pivoting toward the disc drive base member contacts the chamfered edge of at least one of said guard rails before contacting the disc drive base member.

5. The drive fixture of claim 1 wherein said pair of guide rails are parallel to each other and have a width of separation, said width of separation being adjustable.

6. The drive fixture of claim 5 wherein said base has slotted openings, said guide rails fastened to said base through said slotted openings, said slotted openings for adjusting said width of separation.

7. The drive fixture of claim 1 wherein said stop guard has a slot for positioning the disc drive cover member.

8. The drive fixture of claim 1 wherein said stop guard is C-shaped for positioning the disc drive cover member.

9. The drive fixture of claim 1 wherein said cradle is removably attached to said base.

10. The drive fixture of claim 9 further comprising dowel pins, said base having dowel bores for receiving said dowel pins, said cradle having dowel slots for receiving said dowel pins, said dowel pins for removably attaching said cradle to said base.

11. The drive fixture of claim 1 wherein said cradle has a recess opening for receiving the disc drive base member.

* * * * *